United States Patent
Chen

(10) Patent No.: US 7,283,036 B2
(45) Date of Patent: Oct. 16, 2007

(54) WIRELESS DISPLAY DEVICE AND RADIO FREQUENCY IDENTIFICATION SYSTEM USING THE SAME

(75) Inventor: Jung Yang Chen, Taipei (TW)

(73) Assignee: Chung -Hsin Electric & Machinery Mfg. Corp., Taoyuan Hsien (TW)

( * ) Notice: Subject to any disclaimer, the term of this patent is extended or adjusted under 35 U.S.C. 154(b) by 183 days.

(21) Appl. No.: 11/248,413

(22) Filed: Oct. 13, 2005

(65) Prior Publication Data

US 2006/0077045 A1    Apr. 13, 2006

(30) Foreign Application Priority Data

Oct. 13, 2004    (TW) ............... 93131058 A

(51) Int. Cl.
*H04Q 5/22* (2006.01)
(52) U.S. Cl. ............... 340/10.34; 340/572.1; 340/5.91; 235/492
(58) Field of Classification Search .. 340/572.1–572.9, 340/10.34, 5.91, 10.6; 235/492
See application file for complete search history.

(56) References Cited

U.S. PATENT DOCUMENTS

| | | | |
|---|---|---|---|
| 5,850,416 A | 12/1998 | Myer | |
| 6,108,367 A | 8/2000 | Herman et al. | |
| 6,118,426 A | 9/2000 | Albert et al. | |
| 2003/0076968 A1* | 4/2003 | Rast | 381/124 |
| 2004/0145451 A1* | 7/2004 | Failing | 340/5.91 |
| 2004/0222889 A1* | 11/2004 | Hoshina et al | 340/572.8 |
| 2005/0122221 A1* | 6/2005 | Chuang et al. | 340/571 |

* cited by examiner

*Primary Examiner*—Jeffery Hofsass
*Assistant Examiner*—Hoi C. Lau
(74) *Attorney, Agent, or Firm*—Rosenberg, Klein & Lee

(57) ABSTRACT

A wireless display device includes an antenna unit, a processing unit, a display unit, and a power supply unit. The antenna unit is provided for receiving a first electromagnetic wave and a third electromagnetic wave, and transmitting a second electromagnetic wave. The processing unit is connected to the antenna unit for obtaining an identification data, a display data and a first electric power from the first electromagnetic wave, and the first electric power provides power for the processing unit. Additionally, the display unit is connected to the processing unit for displaying an image in accordance with the display data via the processing unit. The power supply unit is connected to the antenna unit and the display unit for obtaining a second electric power from the third electromagnetic wave so as to provide the display unit with the second electric power.

7 Claims, 3 Drawing Sheets

WIRELESS DISPLAY DEVICE AND RADIO FREQUENCY IDENTIFICATION SYSTEM USING THE SAME

TECHNICAL FIELD

The present invention relates to a display device, and more particularly to a wireless display device, which displays an image without the need for battery power or external power.

BACKGROUND OF THE INVENTION

Radio frequency identification (RFID) products have been widely used in many fields, such as warehouse management, container management, medical management, animal management or door access management and so on. One of the latest applications is the electronic shelf label (ESL) system, as disclosed in U.S. Patent Publication No. 2004/0035937. However, in the above applications, a host system used to receive and transmit the signals, and a number of RF transponders are required. In certain cases, such as ESL systems, the RF transponders do not only reply the identification request from the host system but also display the images required by the host system. Therefore, generally, in such a situation, the RF transponders need a display to immediately update the current image based on the request of the host system. For examples, the updated price and the inventory are displayed.

However, this kind of RF transponder equipped with a display needs the additional electric power to drive the display. The well-known method for providing the additional electric power includes using an external power supply such as a battery. Although using the battery has more advantages and higher practicability, the lifespan of the best battery currently available lasts at least 3-5 years. That is, the RF transponder powered by the battery needs to spend money and manpower to change the battery periodically. No doubt, for the shopping mall adopting ESL systems, this is a heavy financial burden. Furthermore, during the period of replacing the exhausted battery, the trade in the market is badly affected somewhat.

SUMMARY OF INVENTION

The primary objective of the present invention is to provide a wireless display device, which displays and maintains an image without the need for battery power or additional external power.

The wireless display device mainly includes an antenna unit, a processing unit, a display unit, and a power supply unit. The antenna unit includes a first antenna provided for receiving a first electromagnetic wave and transmitting a second electromagnetic wave, and a second antenna provided for receiving a third electromagnetic wave. Additionally, the first electromagnetic wave carries an identification data and a display data, and the second electromagnetic wave carries a verification message. The processing unit is connected to the first antenna for obtaining the identification data, the display data and a first electric power from the first electromagnetic wave, and resulting the verification message after verifying the identification data. Furthermore, the first electric power provides power for the processing unit. The display unit is connected to the processing unit for displaying an image in accordance with the display data via the processing unit. Then, the power supply unit is connected to the second antenna and the display unit for obtaining a second electric power from the third electromagnetic wave so as to provide the display unit with the second electric power.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
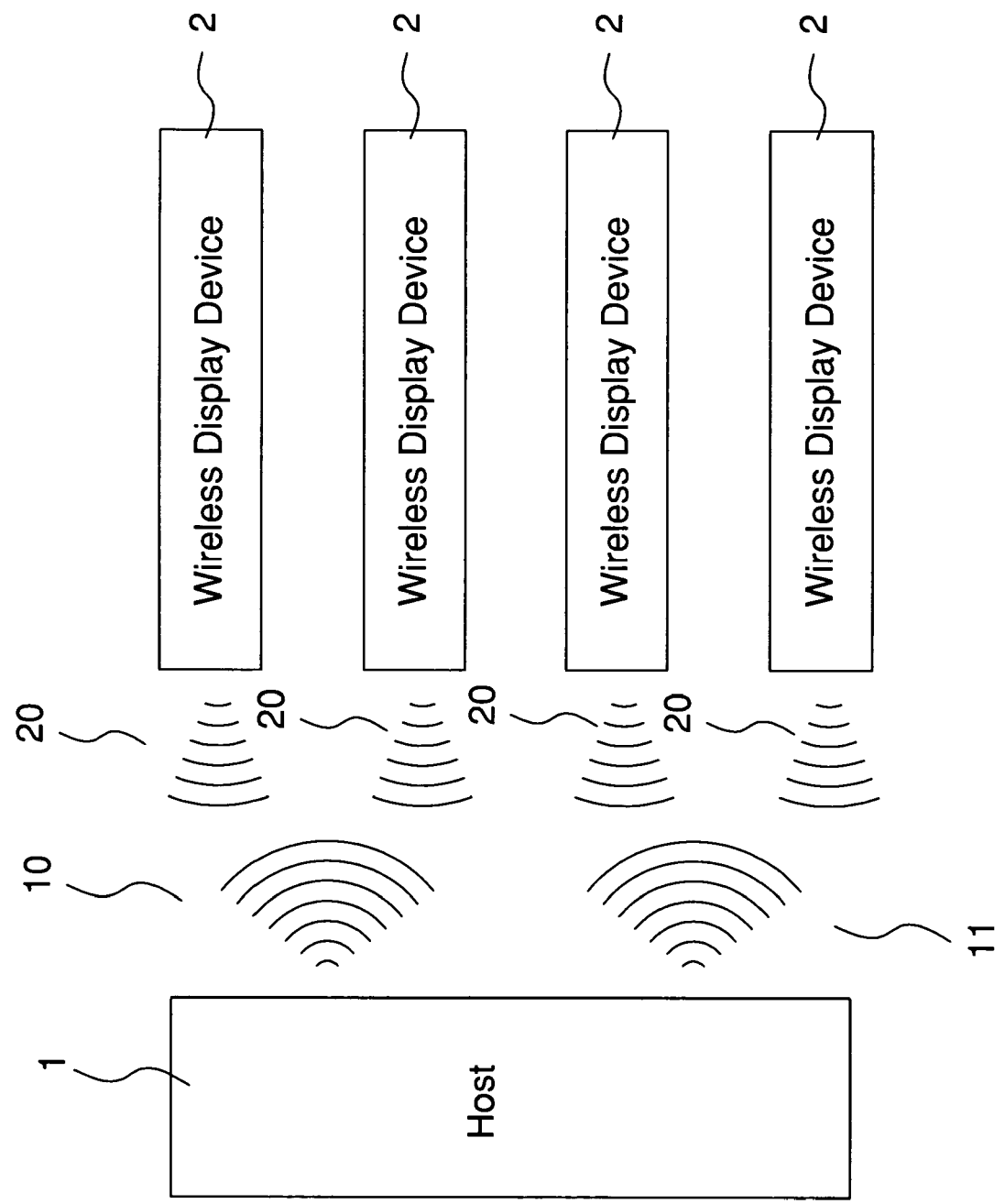
FIG. 1 shows a block diagram of a preferred embodiment of the present invention.

FIG. 1 shows a preferred embodiment of the present invention, which discloses a host 1 and a plurality of the wireless display devices 2. The host 1 has at least two RFID modules. One of the RFID modules is provided for transmitting a first electromagnetic wave 10 and receiving a second electromagnetic wave 20. The other one of the RFID modules is provided for transmitting a third electromagnetic wave 11. Additionally, the first electromagnetic wave 10 carries an identification data and a display data, and each second electromagnetic wave 20, which carries a verification message, is to respond to the host 1 from each of the wireless display devices 2. The first electromagnetic wave 10 and the third electromagnetic wave 11 are transmitted simultaneously, and the third electromagnetic wave 11 has a transmit power greater than the first electromagnetic wave 10 so as to possess a greater electric power. In the present invention, the host 1 and the wireless display devices 2 could be spaced out several meters apart. Therefore, low frequency communications between the host 1 and the wireless display devices 2 are not suitable for some circumstances. Accordingly, the first electromagnetic wave 10 and the second electromagnetic wave 20 preferably have a frequency ranging between 0.3 and 3 GHZ respectively.

Each of the wireless display devices 2 is capable of receiving the first electromagnetic wave 10 and the third electromagnetic wave 11, and obtaining the identification data, the display data and a first electric power from the first electromagnetic wave 10, and also obtaining a second electric power from the third electromagnetic wave 11, and transmitting the second electromagnetic wave 20, which carries the verification message after verifying the identification data. Therefore, each of the wireless display devices 2 obtains the required power from the first electromagnetic wave 10 and the third electromagnetic wave 11, and displays an image in accordance with the display data respectively.

Figure 2:
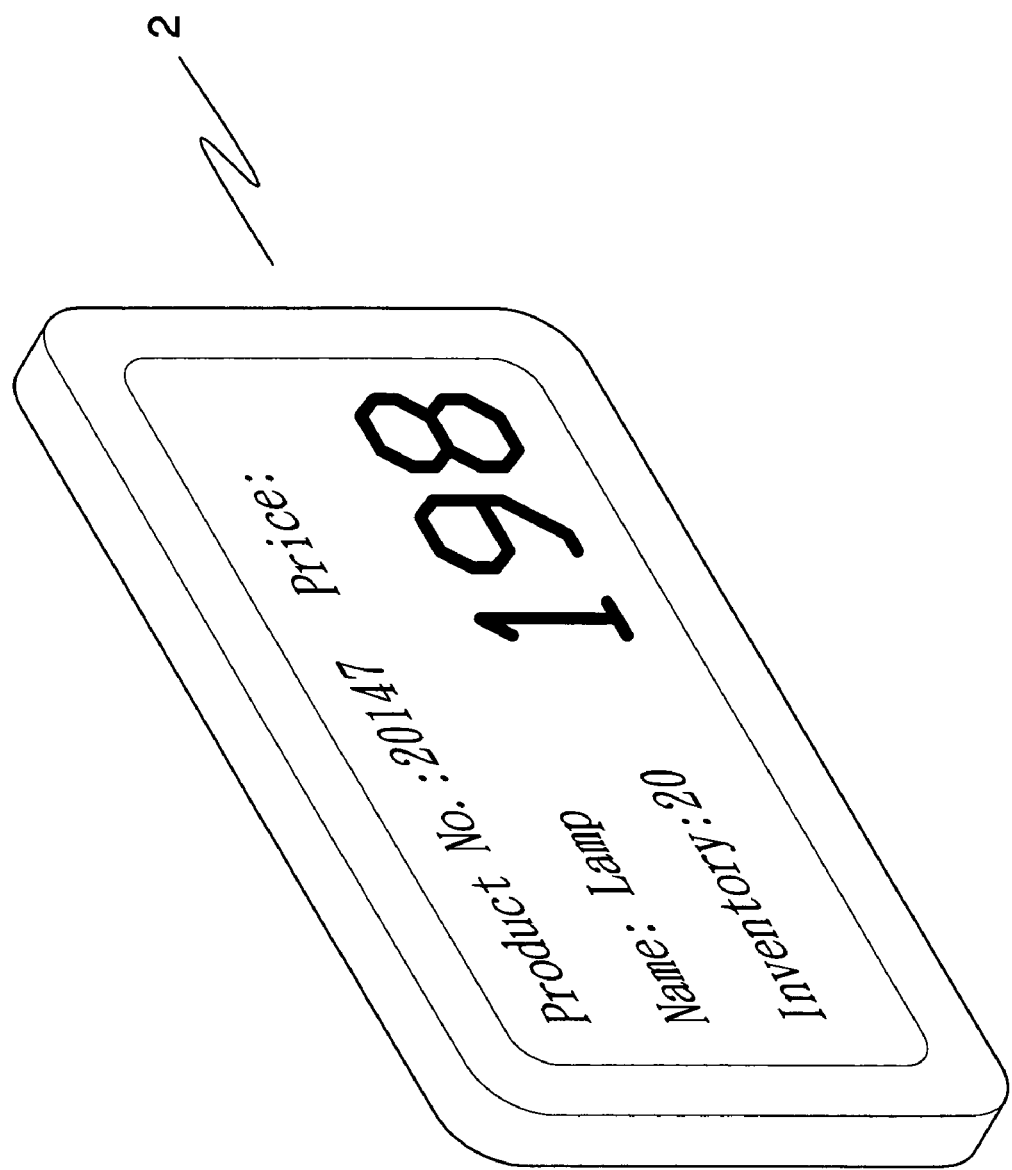
FIG. 2 shows a perspective view of a wireless display device of the present invention.

As shown in FIG. 2, the present invention is applied to an electronic shelf label (ESL) system and each of the wireless display devices 2 could be fixed on shelves respectively, so as to indicate information about merchandise placed on the shelves. The information could include product numbers, names and prices etc. When the host 1 is requested for updating the information about the merchandise, the updated information results from a display data which is carried with the first electromagnetic wave 10 by applying modulating technologies. Furthermore, the first electromagnetic wave 10 also carries an identification data according to the need for modifying particular information, so as to limit to some particular wireless display devices 2, which could receive the particular information only. After the particular wireless display devices 2 receives the first electromagnetic wave 10, the identification data and the display data are obtained through demodulating technologies. In addition, after verifying the identification data, an image in accordance with the display data is displayed, and the image displays the updated information.

According to the foregoing descriptions, more significantly, the wireless display devices 2 of the present invention display the information without requiring any additional external power supplies, such as a battery, because the power is obtained from the first electromagnetic wave 10 and the third electromagnetic wave 11. Additionally, the third electromagnetic wave 11 is a spare electromagnetic wave transmitted from the host 1 that would make the wireless display devices 2 obtained a greater electric power, so as to support the required power during updating and displaying the information. Regarding to the first electromagnetic wave 10, the electric power obtained from the first electromagnetic wave 10 is generally used to demodulate and process the identification data and the display data, and also to transmit the second electromagnetic wave 20. Accordingly, the third electromagnetic wave 11 supplies more electric power if required.

Figure 3:
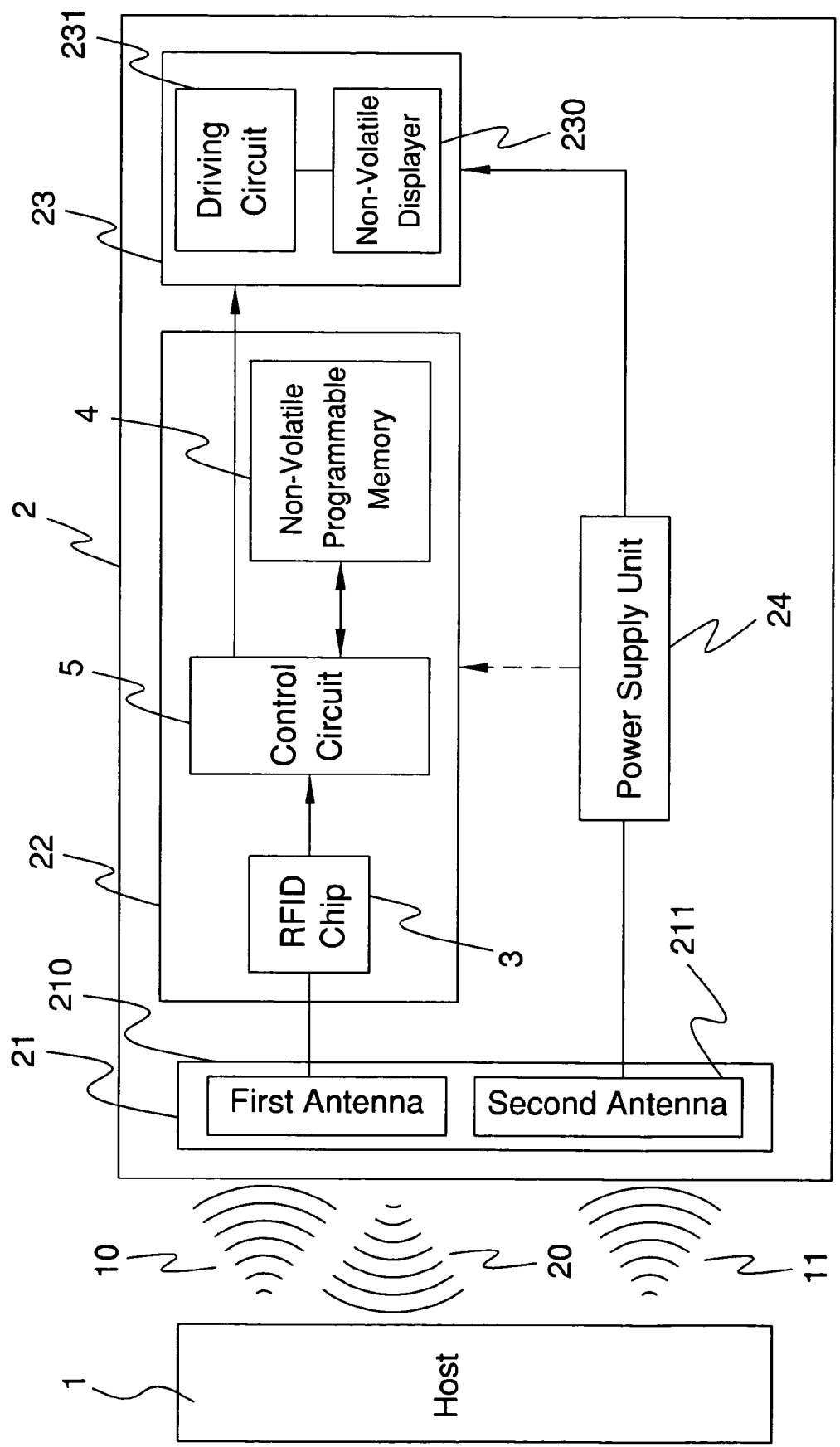
FIG. 3 shows a block diagram of the wireless display device of the present invention.

In addition, FIG. 3 further shows that the wireless display device 2 includes an antenna unit 21, a processing unit 22, a display unit 23, and a power supply unit 24. The antenna unit 21 includes a first antenna 210 provided for receiving the first electromagnetic wave 10 and transmitting the second electromagnetic wave 20, and a second antenna 211 provided for receiving the third electromagnetic wave 11. The first electromagnetic wave 10 carries the identification data and the display data, and the second electromagnetic wave 20 carries the verification message. The processing unit 22 is connected to the first antenna 210 for obtaining the identification data, the display data and the first electric power from the first electromagnetic wave 10, and resulting the verification message after verifying the identification data. Furthermore, the first electric power provides power for the processing unit 22. The display unit 23 is connected to the processing unit 22 for displaying the image in accordance with the display data via the processing unit 22. The power supply unit 24 is connected to the second antenna 211 and the display unit 23 for obtaining the second electric power from the third electromagnetic wave 11 so as to provide the display unit 23 with the second electric power.

Particularly, when the first electromagnetic wave 10 receives the first electric power, the identification data and the display data are obtained by a demodulating circuit, and an electric power is sensed by a sense circuit so as to charge a capacitor. The electric power stored in the capacitor is the first electric power. In addition, after the identification data is verified, the processing unit 22 responds the identification data to the host 1 and controls the display unit 23 to display the image in accordance with the display data. The identification data is carried with the second electromagnetic wave 20 by the modulating technologies to the host 1, so as to allow the host 1 verifying whether the display data is delivered to the wireless display device 2.

When the processing unit 22 receives the first electromagnetic wave 10, the power supply unit 24 receives the third electromagnetic wave 11 at the same time via the second antenna 211. Similarly to the above procedures between the processing unit 22 and the first electromagnetic wave 10 for the first electric power, the second electric power is accordingly obtained from the third electromagnetic wave 11, so as to provide the display unit with the second electric power.

In FIG. 3, the display unit 23 includes a non-volatile displayer 230 and a driving circuit 231 connected to the non-volatile displayer 230. The non-volatile displayer 230 maintains the image without requiring the power and requires the power only when updating the image. Furthermore, the processing unit 22 controls the driving circuit 231 whereby the driving circuit 231 drives the non-volatile displayer 230. In the present invention, the non-volatile displayer 230 is the Electronic Paper (cholesteric liquid crystal display) developed by E. Ink Inc. in the United States of America preferably. Accordingly, the displaying image of the non-volatile displayer 230 is maintained and free from the additional power supply.

Because the non-volatile displayer 230 requires more operation voltage than the processing unit 22, the second electric power from the power supply unit 24 is provided for the non-volatile displayer 230 and the driving circuit 231. Additionally, the power supply unit 24 could be further arranged for detecting whether the first electric power is sufficient for the processing unit 22, so as to allow the second electric power supporting the processing unit 22.

Still in FIG. 3, the processing unit includes a radio frequency identification (RFID) chip 3 connected to the first antenna 210, a control circuit 5 connected to the RFID chip 3 and the display unit 23, and a non-volatile programmable memory 4 connected to the control circuit 5. The display data is stored in the non-volatile programmable memory 4 and is displayed in the display unit 23 via the control circuit 5. Furthermore, the RFID chip 3 of the present invention is preferably the EM 4222, EM 4422, EM 4223 produced by EM Microelectronic Inc., SL3 ICS30, I-CODE produced by Philips and XRA00 produced by ST Microelectronics Co. and the like. Because the capacity of the RFID chip 3 is limited and is only sufficient for storing the identification data, the non-volatile programmable memory 4 in the present invention is further provided for storing the display data accordingly. Generally, the flash memory or the EEPROM is selected as the non-volatile programmable memory 4. Moreover, the control circuit 5 controls the non-volatile programmable memory 4 to store the display data and the driving circuit 231 to have the non-volatile displayer 230 displayed the image.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extent indicated by the broad general meaning of the terms in which the appended claims are expressed.

I claim:

1. A wireless display device, including:
    an antenna unit, including a first antenna provided for receiving a first electromagnetic wave and transmitting a second electromagnetic wave, and a second antenna provided for receiving a third electromagnetic wave, wherein the first electromagnetic wave carries an identification data and a display data, and the second electromagnetic wave carries a verification message;
    a processing unit, connected to the first antenna for obtaining the identification data, the display data and a first electric power from the first electromagnetic wave, and resulting the verification message after verifying the identification data, wherein the first electric power provides power for the processing unit;

a display unit, connected to the processing unit for displaying an image in accordance with the display data via the processing unit; and a power supply unit, connected to the second antenna and the display unit for obtaining a second electric power from the third electromagnetic wave so as to provide the display unit with the second electric power.

2. The wireless display device of claim 1, wherein the processing unit includes:

a radio frequency identification chip, connected to the first antenna;

a control circuit, connected to the radio frequency identification chip and the display unit; and a non-volatile programmable memory, connected to the control circuit, wherein the display data is stored in the non-volatile programmable memory and is displayed in the display unit via the control circuit.

3. The wireless display device of claim 1, wherein the display unit includes a non-volatile displayer and a driving circuit connected to the non-volatile displayer and the processing unit, which controls the driving circuit to drive the non-volatile displayer, wherein the non-volatile displayer maintains the image without requiring the power and requires the power only when updating the image.

4. The wireless display device of claim 2, wherein the display unit includes a non-volatile displayer and a driving circuit connected to the non-volatile displayer and the control circuit, which controls the driving circuit to drive the non-volatile displayer, wherein the non-volatile displayer maintains the image without requiring the power and requires the power only when updating the image.

5. The wireless display device of claim 3, wherein the power supply unit further connects to the processing unit so as to provide the processing unit with the second electric power.

6. The wireless display device of claim 4, wherein the power supply unit further connects to the processing unit so as to provide the radio frequency identification chip, the control circuit and the non-volatile programmable memory with the second electric power.

7. A radio frequency identification system, including:

a host, provided for transmitting a first electromagnetic wave and a third electromagnetic wave, and receiving a second electromagnetic wave simultaneously, wherein the first electromagnetic wave carries an identification data and a display data, and the second electromagnetic wave carries a verification message; and at least one wireless display device, provided for receiving the first electromagnetic wave and the third electromagnetic wave, and transmitting the second electromagnetic wave, wherein the at least one wireless display device obtains the identification data, the display data and a first electric power from the first electromagnetic wave, and obtains a second electric power from the third electromagnetic wave, and transmits the second electromagnetic wave which carries the verification message after verifying the identification data, and wherein the at least one wireless display device obtains power via the first electromagnetic wave and the third electromagnetic wave, and displays an image in accordance with the display data.

* * * * *